United States Patent
Hendler et al.

(10) Patent No.: US 9,783,047 B2
(45) Date of Patent: Oct. 10, 2017

(54) DEVICE FOR PROTECTION AGAINST INCORRECT REFUELLING

(71) Applicant: MAGNA STEYR Fuel Systems GesmbH, Sinabelkirchen (AT)

(72) Inventors: René Hendler, Graz (AT); Dominik Steinmann, Stubenberg (AT)

(73) Assignee: MAGNA STEYR Fuel Systems GesmbH, Sinabelkirchen (AT)

( * ) Notice: Subject to any disclaimer, the term of this patent is extended or adjusted under 35 U.S.C. 154(b) by 0 days.

(21) Appl. No.: 14/953,522

(22) Filed: Nov. 30, 2015

(65) Prior Publication Data
US 2016/0152133 A1    Jun. 2, 2016

(30) Foreign Application Priority Data

Nov. 27, 2014  (EP) .................................. 14195241

(51) Int. Cl.
*B60K 15/04* (2006.01)
*B65B 3/00* (2006.01)
*B65D 47/02* (2006.01)
*B67C 3/00* (2006.01)

(52) U.S. Cl.
CPC ...... *B60K 15/04* (2013.01); *B60K 2015/0461* (2013.01); *B60K 2015/0477* (2013.01); *B60K 2015/0483* (2013.01)

(58) Field of Classification Search
CPC .............. B60K 15/04; B60K 15/043; B60K 2015/0461; B60K 2015/0477; B60K 2015/0483; B60K 15/0403
See application file for complete search history.

(56) References Cited

U.S. PATENT DOCUMENTS

| 3,730,216 | A | * | 5/1973 | Arnett | B60K 15/04 137/588 |
| 4,919,297 | A | * | 4/1990 | Ohasi | B60K 15/04 141/285 |
| 7,293,586 | B2 | * | 11/2007 | Groom | B60K 15/04 141/301 |
| 8,555,937 | B2 | * | 10/2013 | Murabayashi | B60K 15/04 141/312 |

FOREIGN PATENT DOCUMENTS

| DE | 10157090 C1 | 4/2003 |
| DE | 10320992 A1 | 11/2004 |
| DE | 202005021965 U1 | 12/2011 |
| DE | 102011114824 A1 | 4/2013 |
| EP | 1262357 A1 | 12/2002 |
| EP | 1790517 A2 | 5/2007 |
| EP | 2061670 A1 | 5/2009 |
| GB | 2422144 A | 7/2006 |
| WO | 2008032147 A1 | 3/2008 |

* cited by examiner

*Primary Examiner* — Andrew T Kirsch
(74) *Attorney, Agent, or Firm* — Jordan IP Law, LLC; Todd A. Vaughn

(57) ABSTRACT

A device for protection against incorrect refuelling, the device including a housing having housing tabs, a separating element to be opened to permit refuelling, and a closing element arranged in, and axially moveable axially relative to the housing. The closing element has at a periphery thereof closing tabs assigned to the housing tabs to form a catch connection which is reversibly released by insertion of a suitable filler nozzle to open the separating element.

20 Claims, 5 Drawing Sheets

DEVICE FOR PROTECTION AGAINST INCORRECT REFUELLING

CROSS-REFERENCE TO RELATED APPLICATIONS

The present application claims priority 35 U.S.C. §119 to European Patent Publication No. EP 14195241.6 (filed on Nov. 27, 2014), which is hereby incorporated by reference in its entirety.

TECHNICAL FIELD

Embodiments relate to a device for protection against incorrect refuelling, in particular, of a motor vehicle powered by diesel fuel.

BACKGROUND

Depending on engine type, motor vehicles require different fuels, wherein refuelling the motor vehicle with an unsuitable fuel can cause enormous damage to the motor vehicle.

Conventional motor vehicles are normally refuelled at filling stations. The pumps at modern filling stations usually offer several types of fuel, normally diesel and petrol with different octane ratings.

A first step for preventing incorrect refuelling was the introduction of pump valves with different diameters now, for example, diesel pump valves have a diameter of ≥23.6 mm, petrol pump valves however have a diameter of less than 21.3 mm.

Pump valves are colloquially called filler nozzles and are connected to the fuel filler pump via a hose.

By adapting the diameter of the motor vehicle tank connection (tank filler pipe), at least on petrol-powered motor vehicles, incorrect refuelling with diesel can be prevented in a simple manner.

The risk of accidentally introducing petrol, which is delivered through a petrol filler nozzle smaller than a diesel filler nozzle, into a diesel-powered vehicle however persists.

The general prior art describes for this problem a number of different solutions for preventing incorrect refuelling of a diesel-powered motor vehicle with petrol.

German Patent Publication No. DE 103 20 992 A1, for example, describes a device wherein an additional device is introduced into the tank connector of a vehicle. The annular additional device reduces the diameter of the tank connector by way of a plurality of radial elements arranged around the periphery. In the region of the radial elements, the diameter is smaller than the diameter of the suitable filler nozzle. The additional device is designed tapering upward towards the opening so that the suitable filler nozzle can be introduced easily and simply. On further insertion of the suitable filler nozzle, the radial elements are deformed, tipped or moved such that the opening expands and the filler nozzle can be pushed fully into the tank pipe. The elastic or articulated movement of the radial elements causes a tilting or rotational movement of counterhooks on the device. An unsuitable filler nozzle remains attached to the counterhooks and cannot be introduced further into the filler pipe.

German Patent Publication No. DE 101 57 090 C1 also describes an arrangement for preventing refuelling of a diesel vehicle with lead-free petrol. A blocking lever is provided in the tank connector which is movable to and fro between a rest position and a refuelling position. At its end facing away from the tank opening, the blocking lever is provided with a blocking tab which in the rest position protrudes into the cross section of the tank connector and prevents insertion of an unsuitable filler nozzle into the tank. At its end facing the tank opening, the blocking lever may have an actuation extension which can be actuated by a suitable filler nozzle and moves the blocking lever into a refuelling position.

Further devices concerned with this topic are disclosed amongst others in German Patent Publication No. DE 20200502 1965 and European Patent Publication No. EP 1790517.

SUMMARY

Embodiments relate to a device for protection against incorrect refuelling, in particular of a diesel-powered motor vehicle.

In accordance with embodiments, a device for protection against incorrect refuelling, comprises a housing and a closing element arranged in the housing, wherein the closing element may have at least one closing tab on its periphery and the housing may have at least one housing tab assigned to the closing tab, wherein the closing tab with the assigned housing tab forms a catch connection, wherein the closing tab and assigned housing tab are configured so that the catch connection is reversibly released by insertion of a suitable filler nozzle, so that the closing element is moveable axially relative to the housing, whereby a separating element can be opened and refuelling is possible.

In accordance with embodiments, the suitable filler nozzle may be, in particular, a filler nozzle for a diesel fuel of conventional design.

In accordance with embodiments, an unsuitable filler nozzle is a filler nozzle of smaller diameter than the diesel filler nozzle, as is the case, for example, for filler nozzles for petrol fuels.

The device in accordance with embodiments may also be conceivable in tank systems and/or tank types not used primarily for automotive purposes, such as, for example, heating oil tanks.

The device in accordance with embodiments comprises a housing, wherein the housing may have a tank-side housing end, a filler-side housing end, and a housing interior. The housing may be made of plastic. A housing made of a metallic material may also be used.

In accordance with embodiments, the closing element is arranged inside the housing, i.e., in the housing interior, ensuring inter alia a compact construction of the device. The closing element may be made of plastic. A closing element made of a metallic material may also be used.

In accordance with embodiments, the closing element may have at least one closing tab on its periphery, wherein the closing tab is arranged on the periphery of the closing element. The closing tab may be made of the same material as the closing element.

In accordance with embodiments, the housing may have at least one housing tab on its periphery, wherein a housing tab is assigned to a closing tab. The housing tab may be made of the same material as the housing.

In accordance with embodiments, the closing tab with the assigned housing tab forms the catch connection. The closing tab and the assigned housing tab are configured such that introduction of the suitable filler nozzle releases the catch connection between the closing tab and the assigned housing tab. On further insertion of the suitable filler nozzle in the direction of the tank-side housing end, the closing element moves axially relative to the housing in the direction of the tank-side housing end. Through this movement, the suitable filler nozzle can be inserted in the device so far that it opens the separating element and refilling of a tank is possible.

In accordance with embodiments, "axial" means in the direction of or parallel to the longitudinal axis of the cylindrical housing. "Radial" means in the direction of or parallel to the transverse axis of the cylindrical housing.

In accordance with embodiments, the catch connection between the closing tab and the assigned housing tab is reversibly released by insertion of the suitable filler nozzle, i.e. when the suitable filler nozzle is removed from the device, the closing tab with the assigned housing tab again forms the catch connection.

In accordance with embodiments, refinements are described in the dependent claims, the description and the enclosed drawings.

In accordance with embodiments, the closing element may have at least three closing tabs, wherein the three closing tabs are evenly distributed about the periphery of the closing element.

In accordance with embodiments, the housing may have at least three housing tabs on its periphery (evenly distributed), wherein each housing tab is assigned to closing tab.

In accordance with embodiments, the housing and the closing element arranged in the housing are arranged coaxially.

In accordance with embodiments, the housing is configured substantially cylindrical and the closing element substantially conical, in particular hopper-like.

In accordance with embodiments, the closing element tapers in the direction of the tank-side housing end.

In accordance with embodiments, "transverse" designations below always relate to the position of the transverse axis of the cylindrical housing. "Longitudinal" designations correspondingly relate to the position of the longitudinal axis of the cylindrical housing.

In accordance with embodiments, the hopper-like form of the closing element allows a reduction in the diameter of the device in a constructionally simple manner. A substantially cylindrical form of the closing element is equally advantageous, wherein structurally ribs are provided on the inner periphery of the closing element which taper in the direction of the housing end.

In accordance with embodiments, the separating element is arranged on the tank-side housing end and is configured such that in a separating element starting position, the housing interior and a tank can be separated so that filling the tank via a filler nozzle is not possible.

The separating element starting position thus describes a closed position of the separating element. The separating element may be arranged transversely (normal to the longitudinal axis of the housing).

In accordance with embodiments, the reduction in the diameter of the device, by way of, for example, the hopper-like closing element, prevents incorrect refuelling via an unsuitable filler nozzle since the diameter of the device is configured smaller than the diameter of the unsuitable filler nozzle. The unsuitable filler nozzle, depending on diameter, is blocked at one point of the hopper-like closing element and prevented from further insertion in the direction of the separating element (in the direction of the tank-side housing end) and thus does not reach the separating element. The separating element remains in the separating element starting position.

Because the separating element remains in the separating element starting position, on an attempt to refill the tank via an unsuitable filler nozzle, the filler nozzle immediately shuts off because of the automatic pump valve system integrated as standard in the pump valve (filler nozzle). The separating element can, however, be moved into an open position, out of the separating element starting position, by a suitable filler nozzle.

In accordance with embodiments, the separating element is designed as a flap.

In accordance with embodiments, the separating element is made of an electrically conductive material, in particular a metallic material such as for example spring steel, whereby the separating element serves as a metallic contact point for a suitable filler nozzle and hence acts as an earth.

Advantageously, the closing element is designed at least partially elastic.

In accordance with embodiments, the closing element comprises several notches, in particular in the region of the tank-side housing end, whereby the closing element is subdivided at least partly into several closing element segments. Because of the elastic form of the closing element and the formation of several closing element segments, a radial movement of the closing element and/or closing element segments is possible.

Advantageously, the closing tab and housing tab are configured elastically.

In accordance with embodiments, an elastic clamping element is arranged on an outer periphery of the housing, wherein the clamping element applies a radial return force to the housing tab, whereby in the absence of a suitable filler nozzle, the housing tab is held in a housing tab starting position. The housing tab starting position thus describes a position in which the closing tabs with the assigned housing tabs form the respective catch connections.

Advantageously, the housing tab assigned to the closing tab may have a catch device, wherein in the absence of a suitable filler nozzle, the closing tab engages preferably at a closing tab end in the catch device of the assigned housing tab and thus the catch connection is formed.

In accordance with embodiments, the closing tab is configured such that it may have a radially inward protrusion in the axial direction, wherein the protrusion is configured such that on insertion of the suitable filler nozzle, the closing tab and its assigned housing tab are moved radially outward and thus achieve a release of the catch connection between the closing tab and assigned housing tab.

In accordance with embodiments, "inward" means in the direction of the central longitudinal axis of the cylindrical housing, while "outward" describes the opposite direction.

In accordance with embodiments, the closing tab comprises a plurality of slip elements, wherein the slip elements are configured on an outer periphery of the closing element in the direction of the housing.

In accordance with embodiments, an axial sliding block guide on an inner periphery of the housing is assigned to each slip element, wherein the respective slip element can be guided axially in the respective sliding block guide of the housing. The slip elements may be particularly arranged on the closing element in the region of the tank-side housing end. The sliding block guide is advantageously configured such that the slip elements can be moved radially outward in particular only in the region of the tank-side housing end.

In accordance with embodiments, the device may have at least one spring element in the region of the tank-side housing end, wherein the spring element applies an axial return force to the closing element, whereby in the absence of the suitable filler nozzle, the closing element is pressed into a closing element starting position. In the closing element starting position, the closing tab of the closing element with its assigned housing tab forms the catch connection.

In accordance with embodiments, the spring element is formed integrally with the separating element, whereby a reduction in the number of components is achieved together with a more compact construction of the device.

Due to the overall compact and simple construction, the device can advantageously be installed and removed through a refuelling pedestal of a tank connection of the tank. Fixing in the tank connection takes place preferably by way of a bayonet connection between the housing of the device and the tank connector, wherein any type of tank connector can be used.

DRAWINGS

Embodiments will be illustrated by way of example in the drawings and explained in the description below.

DESCRIPTION

Figure 1:
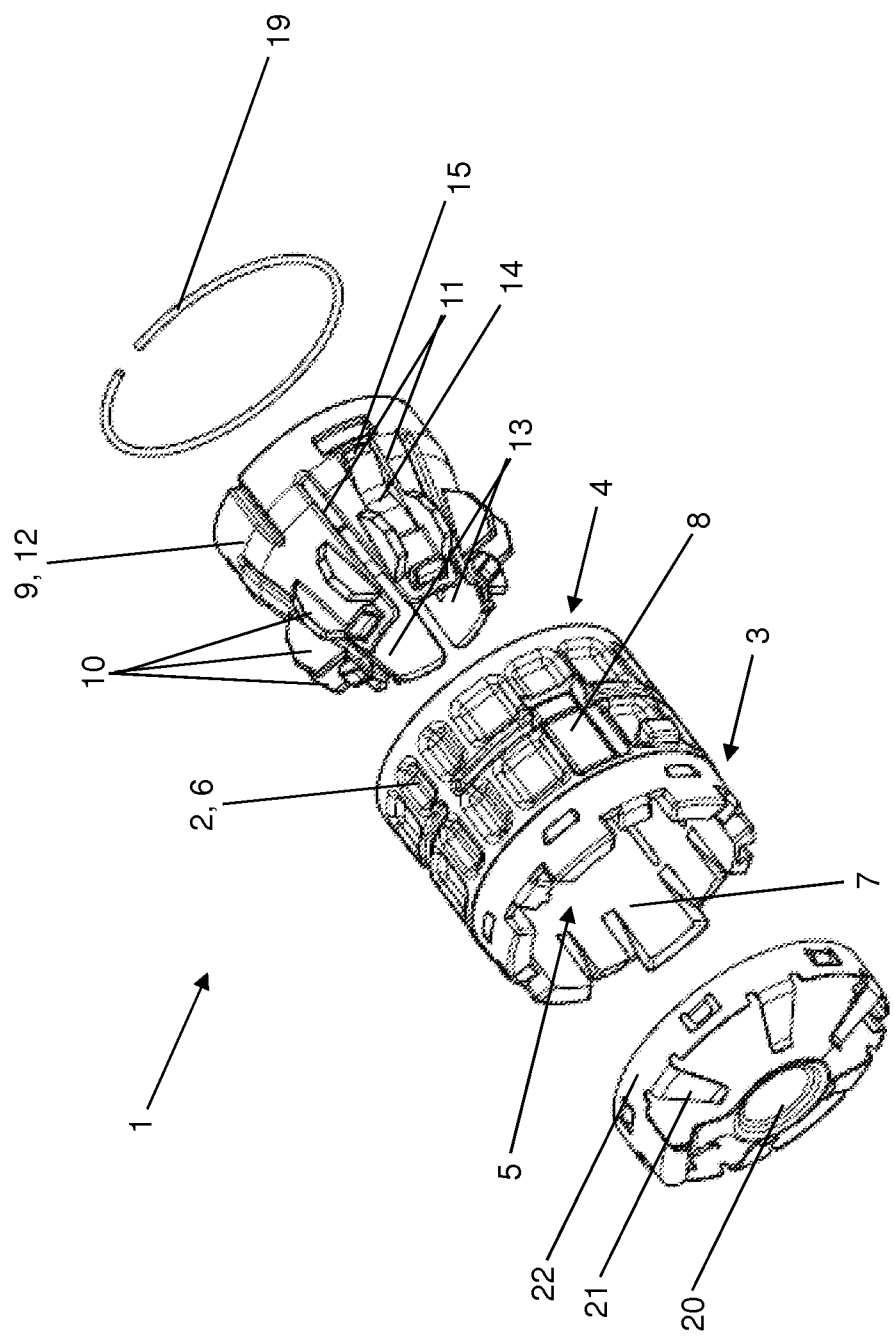
FIG. 1 illustrates an exploded view of a device, in accordance with embodiments.

With reference to FIGS. 1 to 5, embodiments of a device 1 are described below. FIG. 1 illustrates an exploded view of the device 1 for protection against incorrect refuelling, and serves for a brief description of the basic components of the device 1. Details are illustrated more closely in FIGS. 2 to 5.

The device 1 comprises a housing 2 with a closing element 9, a clamping element 19 and a spring element 21, wherein the spring element 21 is designed integrally with the separating element 20. The housing 2 may have a tank-side housing end 3, a filling-side housing end 4 and a housing interior 5. The housing 2 may be designed substantially cylindrical. The housing 2 may have a plurality of housing tabs 8 on its periphery. The housing tabs 8 are evenly distributed over the periphery of the housing 8.

The closing element 9 may have a plurality of closing tabs 14 on its periphery, wherein the closing tabs 14 are evenly distributed over the periphery of the closing element 9. The closing element 9 may be substantially conical, in particular hopper-like. The closing element 9 tapers in the direction of the tank-side housing end 3. The closing element 9 comprises a plurality of notches 11, whereby the closing element 9 is subdivided at least partially into several closing element segments 13. A plurality of slip elements 10 is arranged in the region of the closing element segments 13.

The separating element/spring element assembly 22 is designed as a circular ring and may have a flap-like separating element 20 and a plurality of tab-like spring elements 21. The spring elements 21 are distributed substantially evenly over the circular separating element/spring element assembly 22. The separating element/spring element assembly 22 may be connected via one and/or a plurality of clip connections to the tank-side housing end 3. The spring elements 21 apply an axial return force to the closing element 9, whereby in the absence of the suitable filler nozzle, the closing element 9 is pressed into a closing element starting position.

Figure 2:
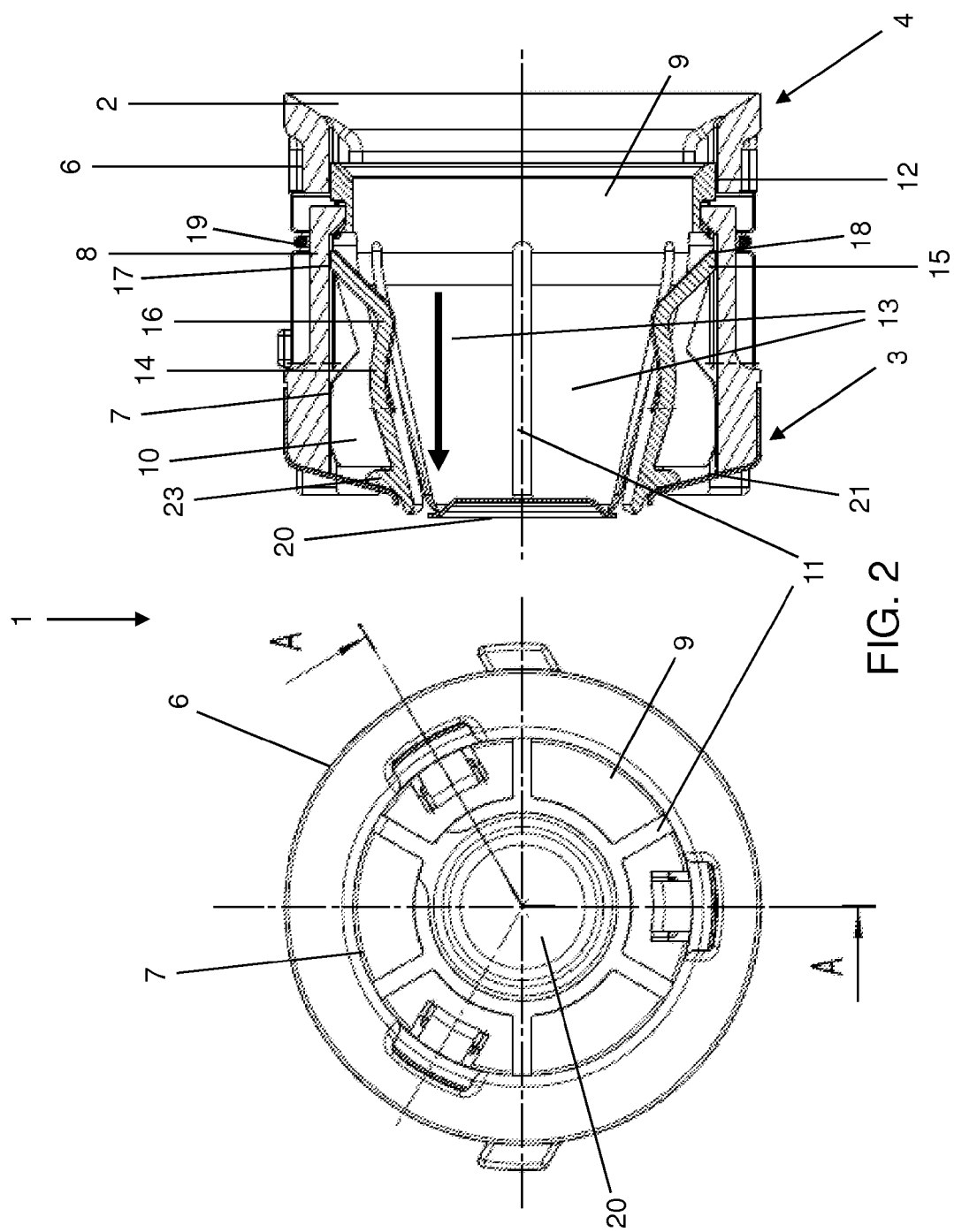
FIG. 2 illustrates a cross-section view (A-A) of the device of FIG. 1.

FIG. 2 illustrates a cross-section view (section A-A) of the device 1 of FIG. 1. The closing element 9 is arranged coaxially in the housing 2 (in the housing interior 5). FIG. 2 illustrates the hopper-like formation of the closing element 9.

A housing tab 8 is assigned to each closing tab 14, wherein a respective closing tab 14 with its assigned housing tab 8 in the region of a closing tab end 15 forms the respective catch connection 17. The housing tab 8 assigned to the respective locking tab 14 comprises a catch device 18, wherein in the absence of a suitable filler nozzle, the respective closing tab 14 is engaged preferably at the closing tab end 15 in the catch device 18 of the assigned housing tab 8, and thus, the respective catch connection 17 is formed.

The closing tabs 14 and assigned housing tabs 8 are configured such that introduction of the suitable filler nozzle releases all catch connections 17 between the respective closing tabs 14 and the assigned housing tabs 8. On further insertion of the suitable filler nozzle in the direction of the tank-side housing end 3, the closing element 9 moves axially relative to the housing 2 in the direction of the tank-side housing end 3. The movement described is indicated in FIG. 2 by way of an arrow. This movement allows the suitable filler nozzle to be inserted so far in the device 1 that it opens the separating element 20 (folds it aside in the tank-side direction), allowing refilling of a tank.

The closing tabs 14 are configured such that they each have a radially inward protrusion 16 in the axial direction, wherein the protrusion 16 is configured such that on insertion of the suitable filler nozzle, the closing tabs 14 and the assigned housing tabs 8 are moved radially outward, releasing the respective catch connections 17 between the closing tabs 14 and assigned housing tabs 8.

The catch connections 17 between the respective closing tabs 14 and the assigned housing tabs 8 are released reversibly by insertion of the suitable filler nozzle, i.e. when the suitable filler nozzle is removed from the device 1, all closing tabs 14 together with the assigned housing tabs 8 form the catch connections 17 again (catch).

The closing element 9 comprises a plurality of slip elements 10, wherein the slip elements 10 are arranged on the outer periphery of the closing elements 12 in the direction of the housing 2. An axial sliding block guide on an inner periphery of the housing 7 is assigned to each slip element 10, wherein the respective slip element 10 can be guided axially in the respective sliding block guide of the housing 2.

The slip elements 10 are arranged on the closing element 9 (on the closing element segments 13) in the region of the tank-side housing end 3. The sliding block guide is configured such that the slip elements 10 can be moved radially outward in particular only in the region of the tank-side housing end 3.

In the device 1, stop elements 23 are arranged on the closing element 9 in the region of the tank-side housing end 3 and, on axial movement of the closing element 9 in the direction of the tank-side housing end 3 (arrow direction in FIG. 2), cooperate with the spring elements 21 and serve as an application point for the axial return force of the spring elements 21.

The reduction in diameter of the device 1 by way of the hopper-like closing element 9 prevents incorrect refuelling with an unsuitable filler nozzle, since the diameter of the device 1 is less than than the diameter of the unsuitable filler nozzle. The unsuitable filler nozzle, depending on diameter, is blocked at a point of the hopper-like closing element 9, preventing further insertion in the direction of the separating element 20 (in the direction of the tank-side housing end 3), and thus, does not reach the separating element 20. The separating element remains in the separating element starting position.

In the device 1, the flap-like separating element 20 can be moved by a suitable filler nozzle into an open position, folded aside in the tank-side direction. The elastic clamping element 19 is arranged on an outer periphery of the housing 6, wherein the clamping element 19 applies a radial return force to the housing tab 8, whereby in the absence of the suitable filler nozzle, the housing tabs 8 are held in a housing tab starting position.

Figure 3:
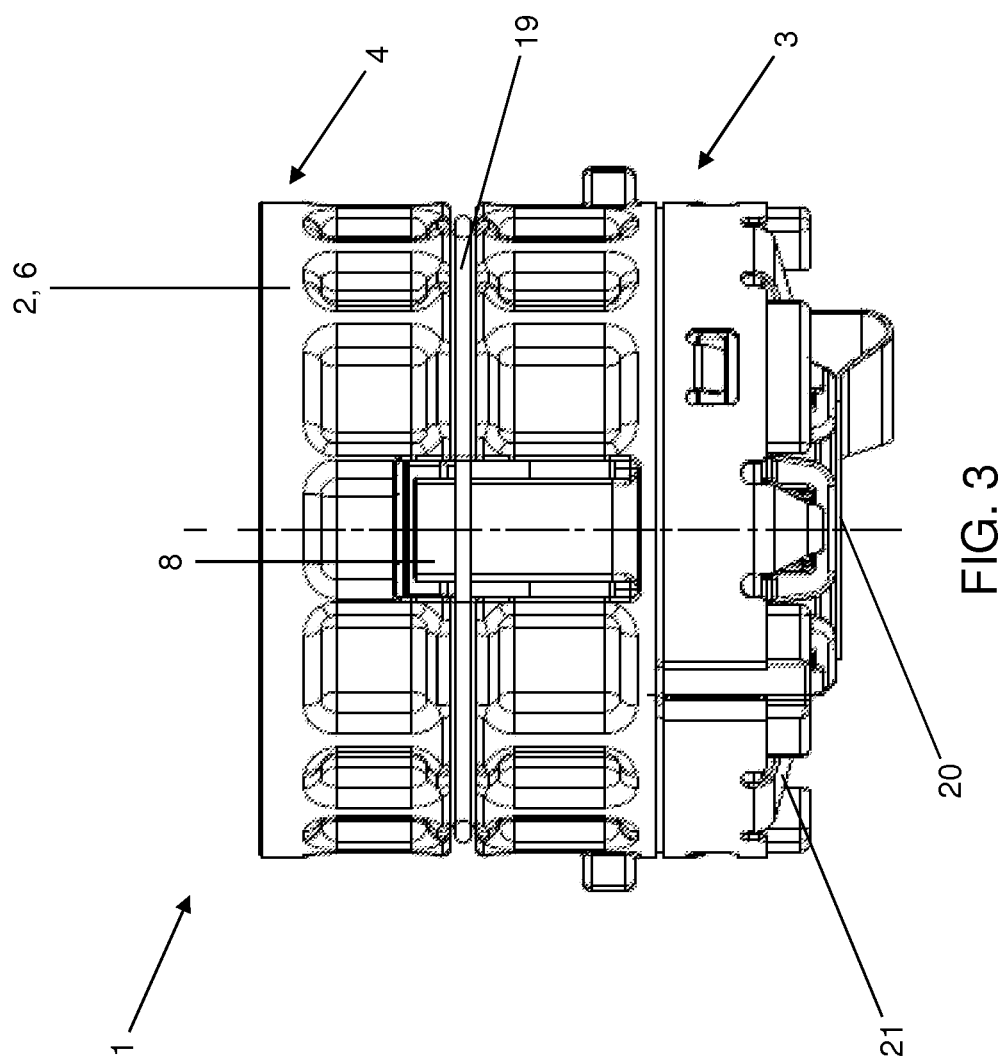
FIG. 3 illustrates a longitudinal depiction of the device of FIG. 1.

FIG. 3 illustrates a longitudinal depiction of the device 1, showing in particular a part of the outer periphery of the housing 6, the arrangement of the clamping element 19 and the arrangement of one of the housing tabs 8.

Figure 4:
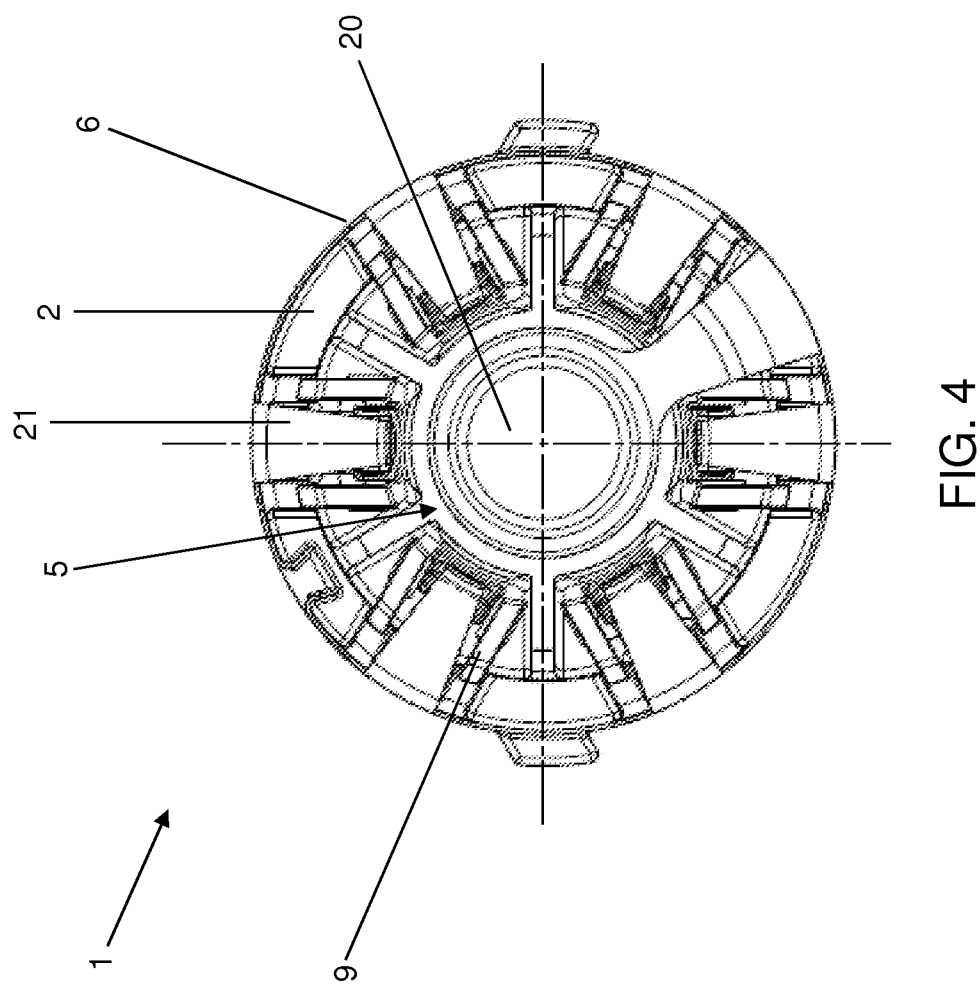
FIG. 4 illustrates a tank-side cross section depiction of the device of FIG. 1.
Figure 5:
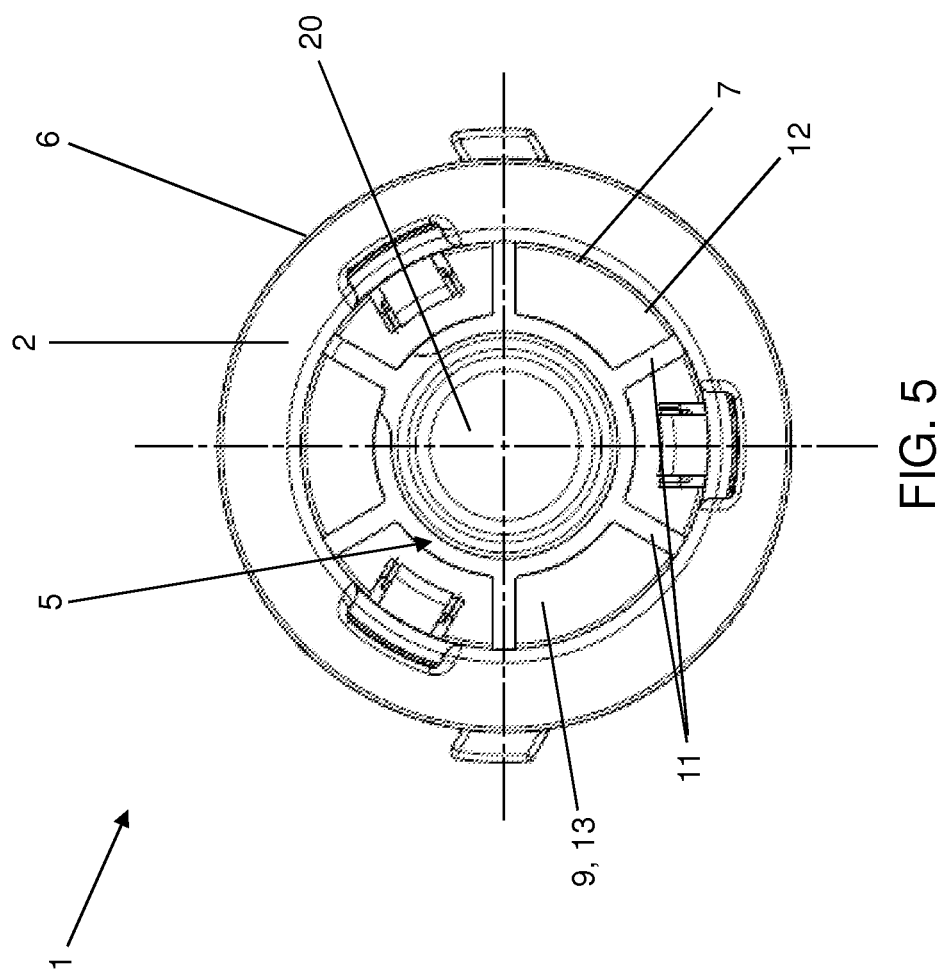
FIG. 5 illustrates a filling-side cross section depiction of the device of FIG. 1.

FIGS. 4 and 5 illustrate cross-section views of the device 1, FIG. 4 illustrating a tank-side view, while FIG. 5 illustrating a filling-side view.

FIG. 4 illustrates, in particular, the separating element/spring element assembly 22. The spring elements 21 and the flap-like separating element 20 are evenly distributed over the periphery of the circular separating element/spring element assembly 22. The tab-like spring elements 21 and the flap-like separating element 20 extend radially inward.

FIG. 5 illustrates, in particular the housing 2 and the coaxially arranged closing element 9 together with the separating element 20. The closing element segments 13 of the closing element 9 taper in the direction of the tank-side housing end 3.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE SIGNS

1 Device
2 Housing
3 Tank-side housing end
4 Filling-side housing end
5 Housing interior
6 Outer periphery of housing
7 Inner periphery of housing
8 Housing tab
9 Closing element
10 Slip element
11 Notch
12 Outer periphery of closing element
13 Closing element segment
14 Closing element tab
15 Closing element tab end
16 Protrusion
17 Catch connection
18 Catch device
19 Clamping element
20 Separating element
21 Spring element
22 Separating element/spring element assembly
23 Stop element

What is claimed is:

1. A device for protection against incorrect refuelling, the device comprising:
a housing having a substantially cylindrical body with a central axis, and at least one housing tab that is an outer periphery of the housing;
a separating element to be opened to permit refuelling; and
a closing element arranged in, and axially moveable axially relative to the housing, the closing element having at a periphery thereof at least one closing tab assigned to the at least one housing tab to form a catch connection which is reversibly released by insertion of a suitable filler nozzle to open the separating element, the at least one closing tab being disposed between the central axis and the assigned at least one housing tab,
wherein the at least one closing tab and the assigned at least one housing tab are configured such that on insertion of the suitable filler nozzle in the device, each of the at least one closing tab and the assigned at least one housing tab are moved radially outward relative to the central axis to release the catch connection between the at least one closing tab and the assigned at least one housing tab.

2. The device of claim 1, wherein the housing and the closing element are coaxially arranged.

3. The device of claim 1, wherein the housing has a tank-side housing end, a filling-side housing end, and a housing interior.

4. The device of claim 3, wherein the separating element is arranged on the tank-side housing end.

5. The device of claim 4, wherein the separating element is configured such that in a separating element starting position of the separating element, the housing interior and a tank are separated to prevent filling of the tank via a filler nozzle.

6. The device of claim 1, wherein the separating element comprises a flap.

7. The device of claim 1, wherein the separating element is moveable into an open position by the suitable filler nozzle.

8. The device of claim 1, wherein the closing element tapers in a direction of a tank-side housing end of the housing.

9. The device of claim 1, wherein the closing element comprises a plurality of notches to subdivide the closing element at least partially into several closing element segments.

10. The device of claim 1, wherein the closing element is at least partially elastically moveable.

11. The device of claim 1, wherein the at least one closing tab and the at least one housing tab are elastically moveable.

12. The device of claim 1, further comprising an elastic clamping element arranged on an outer periphery of the housing, the clamping element being configured to apply a radial return force to the at least one housing tab such that in an absence of the suitable filler nozzle being inserted into the device, the at least one housing tab is held in a housing tab starting position.

13. The device of claim 1, wherein the at least one housing tab has a catch device configured such that, in an absence of the suitable filler nozzle being inserted into the device, the at least one closing tab is to engage at a closing tab end in the catch device to form the catch connection.

14. The device of claim 1, wherein:
the at least one closing tab has a first end and a second end disposed opposite each other in a direction of the central axis, the separating element being disposed closer to the first end than to the second end, the at least one closing tab further including a radially inward protrusion disposed between the first end and the second end in the direction of the central axis, the first end being a first minimum distance from the central axis, the second end being a second minimum distance from the central axis, the protrusion being a third minimum distance from the central axis that is greater than the first distance and less than that of the second distance; and
the protrusion is configured such that on insertion of the suitable filler nozzle in the device, the at least one closing tab and the assigned at least one housing tab are moved radially outward relative to the central axis to release the catch connection between the at least one closing tab and the assigned at least one housing tab so that the least one closing tab and the assigned at least one housing tab each move in a direction perpendicular to the central axis.

15. The device of claim 1, wherein the closing element comprises a plurality of slip elements formed on an outer periphery of the closing element in a direction from the closing element to the housing.

16. The device of claim 15, wherein the housing has at least one axial sliding block guide on an inner periphery of the housing assigned to at least one of the slip elements such that a respective slip element of the at least one of the slip elements is guided axially in a corresponding one of the at least one axial sliding block guide.

17. The device of claim 16, wherein the at least one axial sliding block guide is configured such that the at least one of the slip elements is moveable radially outward only in a region of a tank-side housing end of the housing.

18. The device of claim 1, further comprising at least one spring element arranged in a region of a tank-side housing end of the housing, the at least one spring element being configured to apply an axial return force to the closing element such that in an absence of the suitable filler nozzle being inserted into the device, the closing element is pressed into a closing element starting position.

19. The device of claim 18, wherein the at least one spring element is formed integrally with the separating element.

20. A device for protection against incorrect refuelling, the device comprising:
a housing having a substantially cylindrical body with a central axis, and a plurality of housing tabs that are an outer periphery of the housing;
a separating element to be opened to permit refuelling; and
a closing element arranged in, and axially moveable axially relative to the housing, the closing element having at a periphery thereof a plurality of closing tabs assigned to the housing tabs to form a catch connection which is reversibly released by insertion of a suitable filler nozzle to open the separating element, the closing tabs being disposed between the central axis and the assigned housing tabs,
wherein the closing tabs and the assigned housing tabs are configured such that on insertion of the suitable filler nozzle in the device, each of the closing tabs and the assigned housing tabs are moved radially outward relative to the central axis to release the catch connection between the closing tabs and the assigned housing tabs.

* * * * *